(12) United States Patent
Joukan

(10) Patent No.: US 12,346,622 B2
(45) Date of Patent: Jul. 1, 2025

(54) DISPLAY CONTROL DEVICE, DISPLAY CONTROL SYSTEM, DISPLAY CONTROL METHOD, AND RECORDING MEDIUM

(71) Applicant: Panasonic Automotive Systems Co., Ltd., Kanagawa (JP)

(72) Inventor: Seimizu Joukan, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/615,716

(22) Filed: Mar. 25, 2024

(65) Prior Publication Data

US 2024/0231734 A1     Jul. 11, 2024

Related U.S. Application Data

(63) Continuation of application No. PCT/JP2022/034048, filed on Sep. 12, 2022.

(30) Foreign Application Priority Data

Sep. 30, 2021   (JP) .................................. 2021-160543

(51) Int. Cl.
  *G06F 3/14*      (2006.01)
  *B60K 35/21*     (2024.01)
  *B60K 35/81*     (2024.01)

(52) U.S. Cl.
  CPC ............ *G06F 3/1423* (2013.01); *B60K 35/21* (2024.01); *B60K 35/81* (2024.01); *B60K 2360/1523* (2024.01)

(58) Field of Classification Search
  CPC .. G09G 5/00; G09G 5/38; G09G 5/36; G09G 5/14; B60K 35/81; B60K 35/21;
  (Continued)

(56) References Cited

U.S. PATENT DOCUMENTS 9,317,240 B2 *   4/2016   Lee .................... H04N 21/4122
9,395,946 B2 *   7/2016   Yoneda ................. G06F 3/1423
(Continued)

FOREIGN PATENT DOCUMENTS

JP   2009-140488 A   6/2009
JP   2014-030178 A   2/2014
(Continued)

OTHER PUBLICATIONS

Notice of Reasons for Refusal mailed on Nov. 19, 2024, for family member Japanese patent application No. 2021-160543 with English translation thereof.

(Continued)

*Primary Examiner* — Vinh T Lam
(74) *Attorney, Agent, or Firm* — GREENBLUM & BERNSTEIN, P.L.C.

(57) ABSTRACT

A display control device is used in a vehicle provided with a plurality of displays each including one or more display regions. The display control device includes: a display region manager that manages a plurality of display regions that are the one or more display regions included in each of the plurality of displays. When the display region manager obtains, from an external terminal, a display request for displaying display data on a display region included in the plurality of display regions, the display region manager: creates a display region table collectively indicating display region information on at least one display region among the plurality of display regions; and outputs the display region table created to the external terminal.

15 Claims, 8 Drawing Sheets

(58) Field of Classification Search
CPC ............ B60K 35/00; B60K 2360/1523; G06F 3/0484; G06F 3/14; G06F 3/1423; B60R 11/02
See application file for complete search history.

(56) References Cited

U.S. PATENT DOCUMENTS

| | | | | |
|---|---|---|---|---|
| 10,303,357 | B2* | 5/2019 | Hayes | H04N 21/4788 |
| 10,747,431 | B2* | 8/2020 | Ryu | G06F 1/165 |
| 11,243,741 | B2* | 2/2022 | Iwasaki | G06F 3/1423 |
| 11,449,200 | B2* | 9/2022 | Masamura | B60K 35/00 |
| 11,450,028 | B2* | 9/2022 | Weng | G06V 20/56 |
| 11,606,598 | B2* | 3/2023 | Sawyer | H04N 21/4524 |
| 11,886,894 | B2* | 1/2024 | He | G06F 3/0483 |
| 12,073,071 | B2* | 8/2024 | Zhou | G06F 3/0486 |
| 2010/0117810 | A1* | 5/2010 | Hagiwara | G06F 3/0483 340/425.5 |
| 2011/0128446 | A1* | 6/2011 | Woo | H04N 21/478 345/173 |
| 2013/0328747 | A1* | 12/2013 | Yoneda | G06F 3/1454 345/3.1 |
| 2014/0078022 | A1* | 3/2014 | Dusterhoff | G06F 3/1454 345/3.1 |
| 2014/0225852 | A1* | 8/2014 | Small | H04N 1/00127 345/1.3 |
| 2015/0224876 | A1* | 8/2015 | Tsunoda | B60K 35/26 345/2.2 |
| 2020/0090621 | A1* | 3/2020 | Yamada | B60K 35/265 |
| 2020/0293262 | A1* | 9/2020 | Lee | G06F 3/1454 |
| 2021/0334116 | A1* | 10/2021 | Kaplan | G06F 9/451 |
| 2022/0234445 | A1* | 7/2022 | Kobata | B60K 35/10 |
| 2023/0097073 | A1* | 3/2023 | Hamabe | B60K 35/22 345/681 |
| 2023/0179698 | A1* | 6/2023 | Gao | B60K 35/00 455/66.1 |

FOREIGN PATENT DOCUMENTS

| | | |
|---|---|---|
| JP | 5725259 B2 | 5/2015 |
| JP | 5920474 B2 | 5/2016 |
| JP | 2017-203909 A | 11/2017 |
| JP | 2022-072281 A | 5/2022 |
| WO | 2013/008901 A1 | 1/2013 |
| WO | 2015/029130 A1 | 3/2015 |

OTHER PUBLICATIONS

International Search Report issued in WIPO Patent Application No. PCT/JP2022/034048, dated Nov. 15, 2022, along with an English translation thereof.

Office Action issued in JP Patent Application No. 2021-160543, mailed Apr. 15, 2025, translation.

* cited by examiner

FIG. 3

Display region table

| Identifier of display region | Position | Size | Display mode | Input and output | ... | Use condition |
|---|---|---|---|---|---|---|
| A | Cluster center | 600 x 400 | Exclusive display mode | Absent | | Arbitrary application |
| B | Cluster bottom | 800 x 500 | Event driven mode | Absent | | Authenticated application |
| C | IVI top | 1200 x 200 | Message display mode | Absent | | Arbitrary application |
| D | IVI Center | 1200 x 1000 | Event driven mode | Present | | Arbitrary application |
| E | IVI Center | 300 x 300 | Overlap display mode | Absent | | Authenticated application |

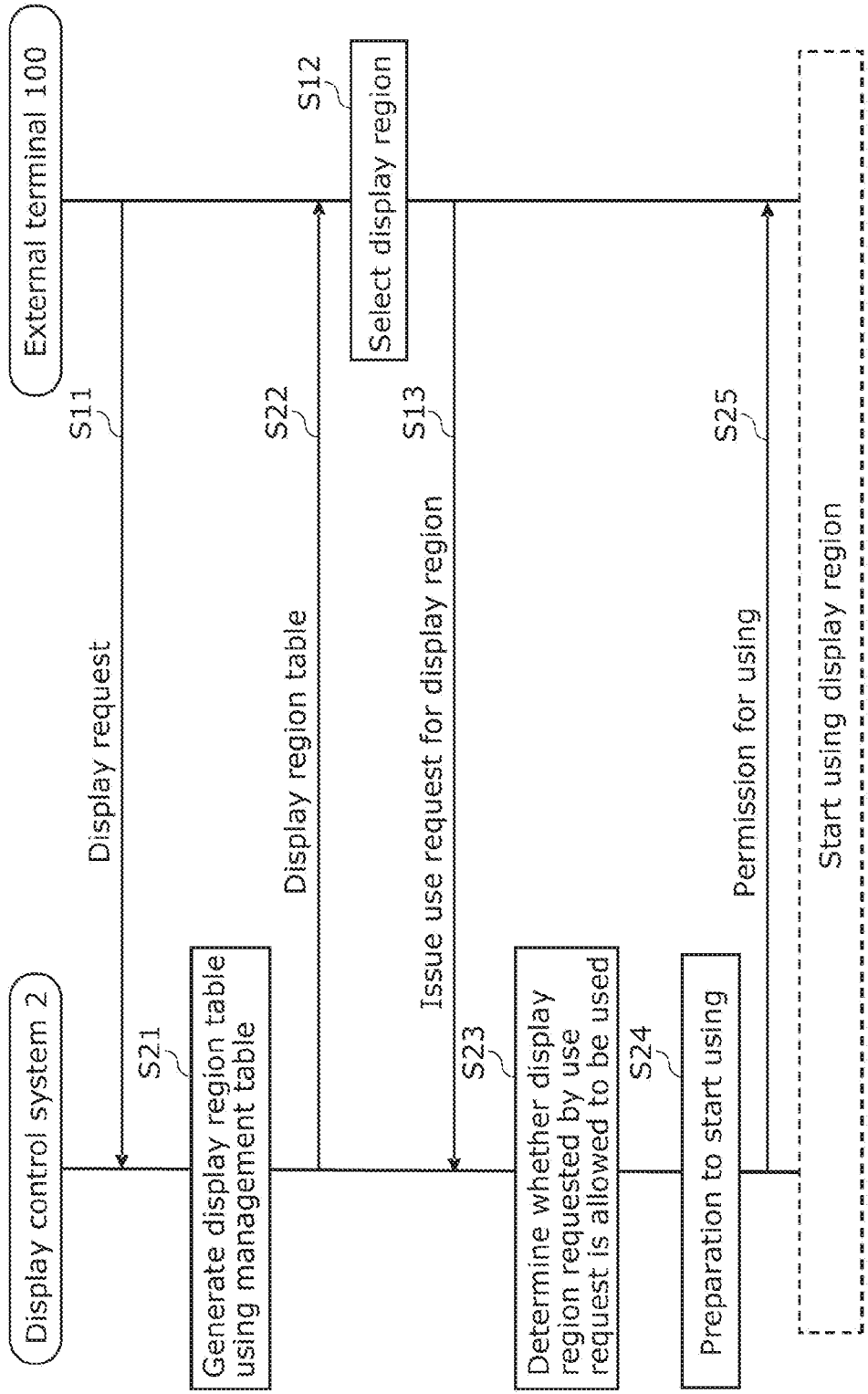

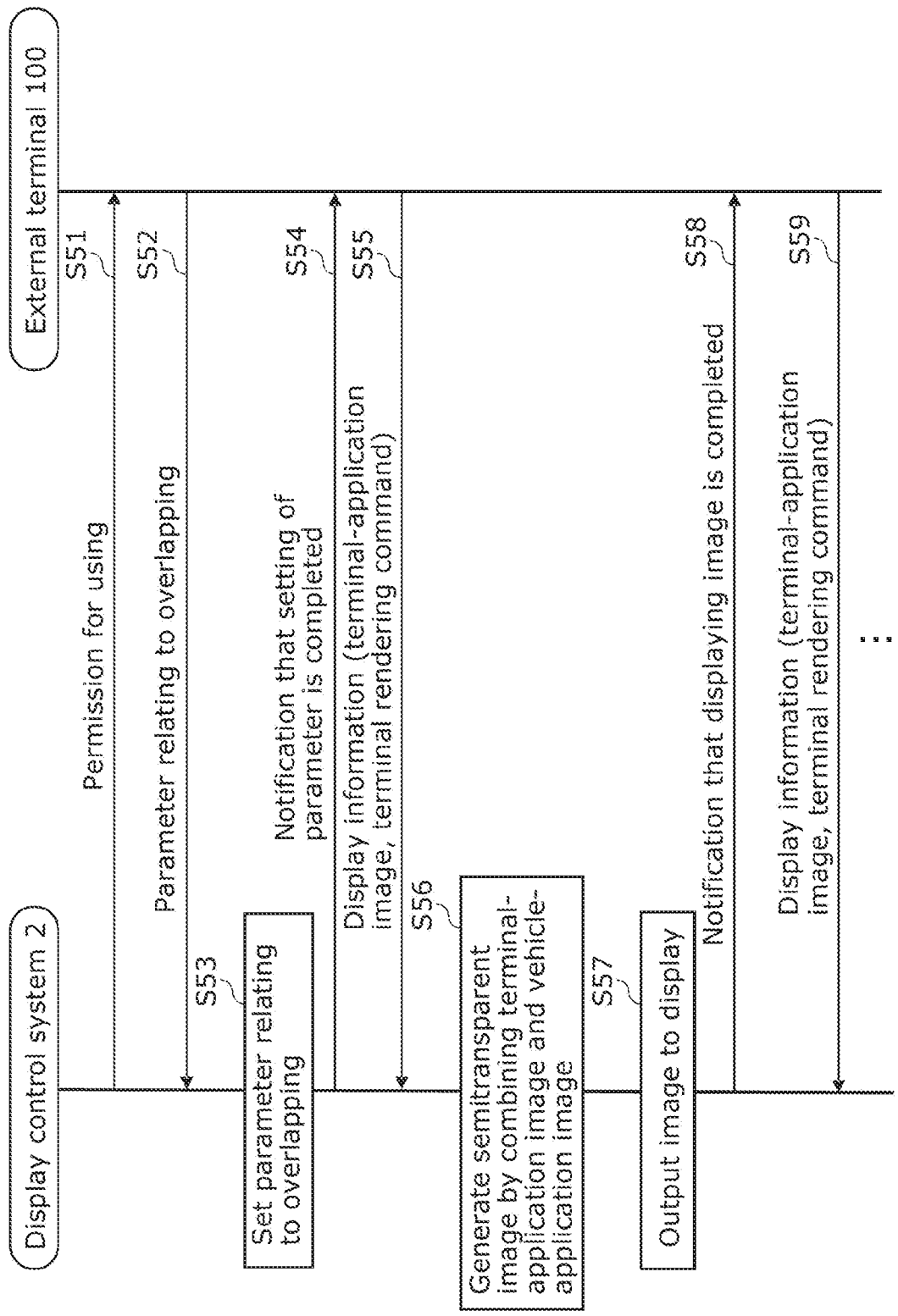

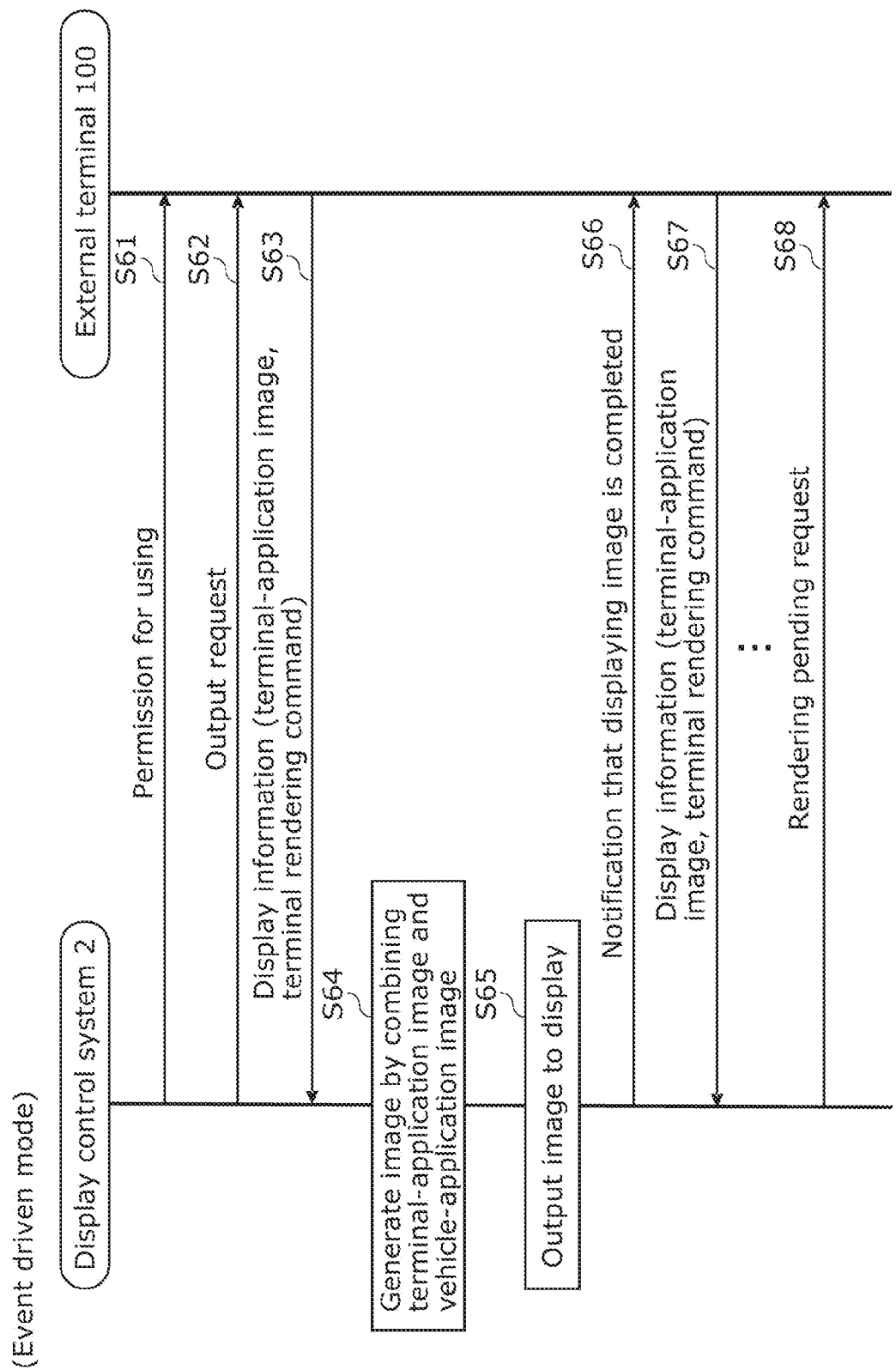

DISPLAY CONTROL DEVICE, DISPLAY CONTROL SYSTEM, DISPLAY CONTROL METHOD, AND RECORDING MEDIUM

CROSS REFERENCE TO RELATED APPLICATIONS

This is a continuation application of PCT International Application No. PCT/JP2022/034048 filed on Sep. 12, 2022, designating the United States of America, which is based on and claims priority of Japanese Patent Application No. 2021-160543 filed on Sep. 30, 2021.

FIELD

The present disclosure relates to a display control device, a display control system, a display control method, and a non-transitory computer-readable recording medium having a computer program recorded thereon.

BACKGROUND

Patent Literature 1 discloses a conventional on-vehicle system that causes an on-vehicle device and a mobile terminal device to work together, and allocates and displays application software information items in the on-vehicle device to a plurality of display regions.

Patent Literature 2 discloses a conventional apparatus that receives a display signal from an inputter and causes one or more of a plurality of displays to display a selected region in accordance with an input received through a user input device.

CITATION LIST

Patent Literature

PTL 1: Japanese Patent No. 5920474
PTL 2: Japanese Patent No. 5725259

SUMMARY

However, the on-vehicle system according to PTL1 and the apparatus according to PTL2 can be improved upon.

In view of this, the present disclosure provides a display control device, a display control system, a display control method, and a non-transitory computer-readable recording medium on which a program is stored, each capable of improving upon the above related arts.

Solution to Problem

In order to achieve the above object, in accordance with an aspect of the present disclosure, a display control device for use in a vehicle provided with a plurality of displays each including one or more display regions includes: a display region manager that manages a plurality of display regions that are the one or more display regions included in each of the plurality of displays, wherein when the display region manager obtains, from an external terminal, a display request for displaying display data on a display region included in the plurality of display regions, the display region manager: creates a display region table collectively indicating display region information on at least one display region among the plurality of display.

General or specific aspects of the present disclosure may be implemented to a system, a device, a method, an integrated circuit, a computer program, or any given combination thereof.

Advantageous Effects

The present disclosure is capable of improving upon the above related arts.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram illustrating an example of a display region table.

FIG. 4 is a sequence diagram illustrating an example of a processing operation between the display control system and an external terminal according to the embodiment.

FIG. 7 is a sequence diagram illustrating an example of a processing operation between the display control system executing an overlap display mode and the external terminal.

FIG. 8 is a sequence diagram illustrating an example of a processing operation between the display control system executing an event driven mode and the external terminal.

DESCRIPTION OF EMBODIMENT

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Note that the respective figures are schematic diagrams and are not necessarily precise illustrations. Therefore, the scales or the like applied in the figures are not necessarily unified. Additionally, components that are essentially the same share like reference signs in the figures. Accordingly, overlapping explanations thereof are omitted or simplified.

Embodiment

Configuration: Display Control System 2

Figure 1:
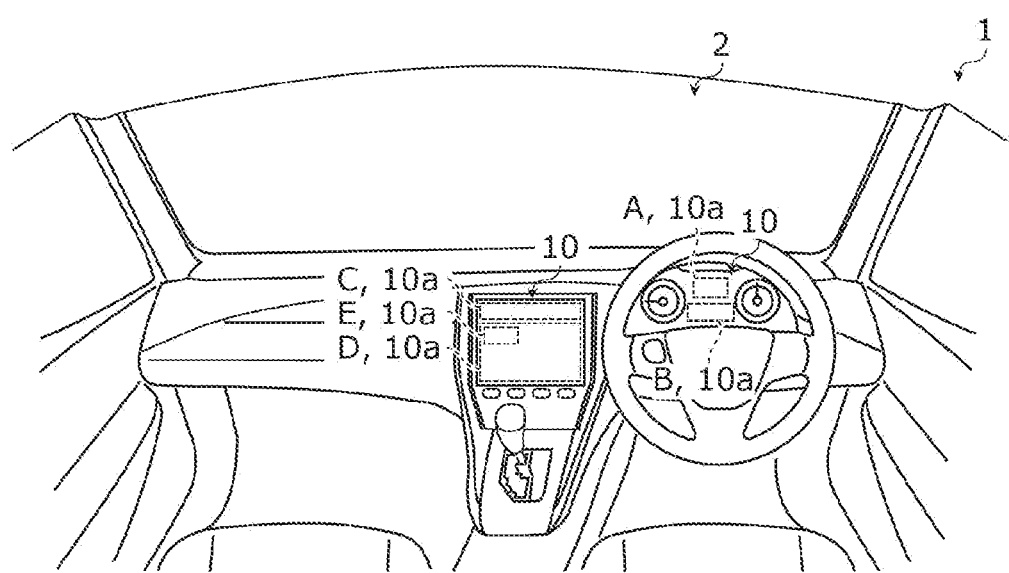
FIG. 1 is a diagram illustrating an example of a display control system and a vehicle according to an embodiment.

FIG. 1 is a diagram illustrating an example of display control system 2 and vehicle 1 according to an embodiment.

Figure 2:
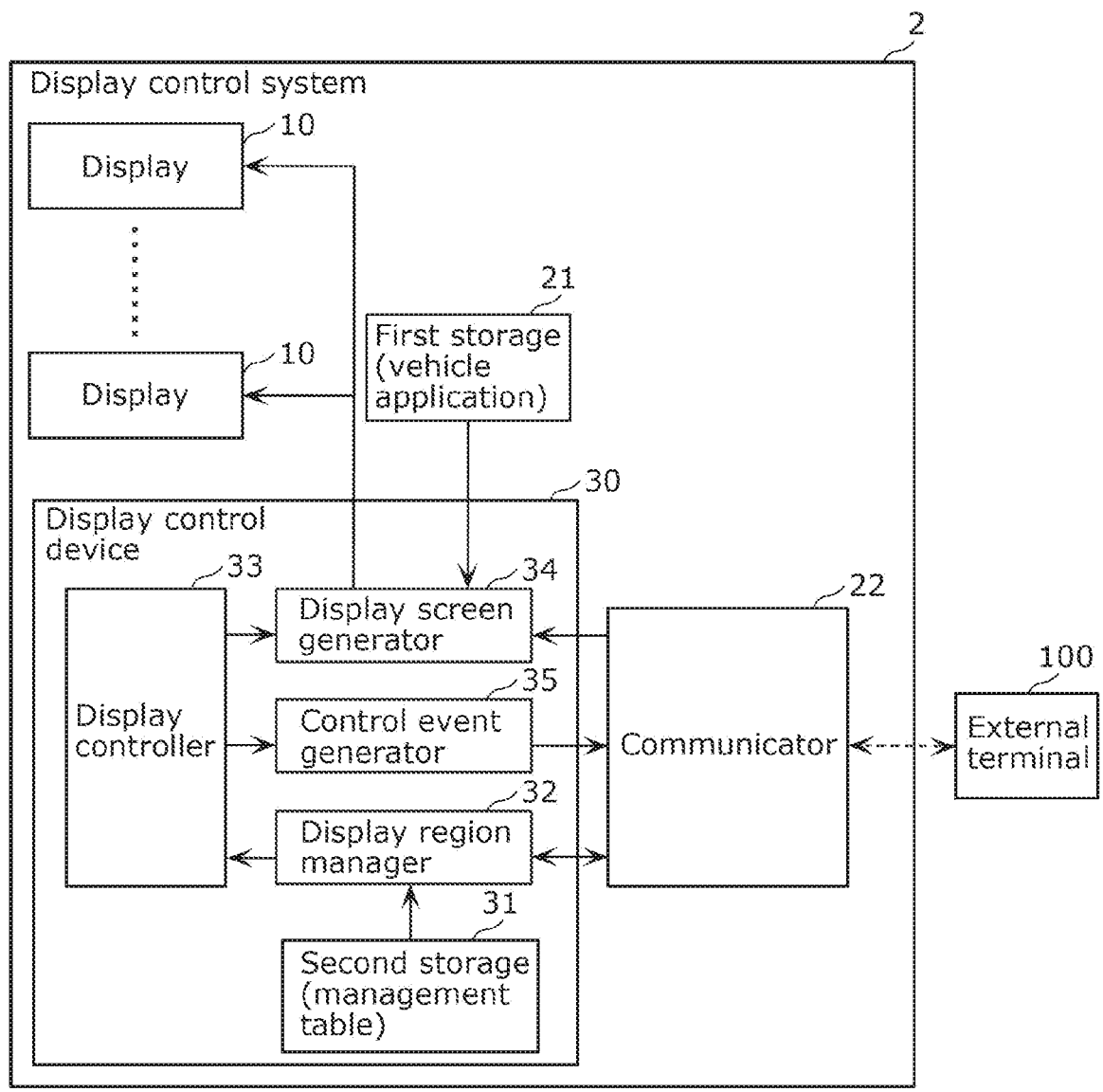
FIG. 2 is a block diagram illustrating an example of the display control system according to the embodiment.

FIG. 2 is a block diagram illustrating an example of display control system 2 according to the embodiment.

As illustrated in FIG. 1 and FIG. 2, display control system 2 is provided in vehicle 1. Vehicle 1 is provided with a plurality of displays 10. When display control system 2 obtains a terminal-application image from external terminal 100, display control system 2 can display the terminal-application image obtained on display 10 selected to be used by external terminal 100 from among the plurality of displays 10.

External terminal 100 is a terminal capable of communicating with display control system 2 in a wired or wireless manner. External terminal 100 is, for example, a personal computer, or a portable terminal such as a smartphone or a tablet terminal. When external terminal 100 is to use one or more display regions 10a included in a plurality of display regions 10a, external terminal 100 can issue, to display control system 2, a display request for displaying display data on one or more display regions 10a included in the plurality of display regions 10a. When issuing the display request, external terminal 100 can also notify display control system 2 of one or more identifiers of the one or more display regions 10a selected to be used.

After issuing the display request, external terminal 100 can issue, to display control system 2, a use request for permission to use the one or more display regions 10a that are selected to use. When display control system 2 permits the use request, external terminal 100 can cause one or more displays 10 of display control system 2 to display the display data such as the terminal-application image.

Specifically, when the use request is permitted, external terminal 100 transmits display information including information to be displayed on the one or more display regions 10a to display control system 2. The display information includes the terminal-application image. The display information will be described later in detail. The terminal-application image is an image of an operating system, an image of a navigation application, an image of an audio application, or the like in external terminal 100.

External terminal 100 may transmit a plurality of display information items to display control system 2, and display control system 2 may cause respective display regions 10a to display images rendered.

Display control system 2 includes the plurality of displays 10, first storage 21, communicator 22, and display control device 30. Display control system 2 may further include external terminal 100.

[Display 10]

The plurality of displays 10 are displays 10 for a vehicle such as a center display, a head-up display (HUD), an instrument cluster (IC) display, and a passenger display provided in vehicle 1. When vehicle 1 travels backward, each of the plurality of displays 10 can display an image captured by an image capturing unit, thus functioning as a rear-view monitor.

Displays 10 each include one or more display regions 10a. That is, a screen of each of the plurality of displays 10 is provided with one or more display regions 10a each of which displays an image. Therefore, a screen of one display 10 may be set with one display region 10a or may be set with a plurality of display regions 10a. In the present embodiment, two displays 10 are exemplified. One of the two displays 10 is an IC display, and the IC display device is set with display regions A and B. The IC display is a display disposed in an instrument panel. The IC display is suitable for displaying measuring instrument information, turn-by-turn information, traffic information, disaster information, driving information, or the like. The other of the two displays 10 is a center display, and the center display is set with display regions C, D, and E. The center display is, for example, a display disposed between a driver's seat and a passenger seat. The center display is suitable for displaying navigation information, media message information, or the like. In the present embodiment, the display regions A, B, C, D, and E may be collectively and simply referred to as display regions 10a. Sizes, positions, and the like of display regions 10a may be configured to be changed freely.

[First Storage 21]

First storage 21 stores vehicle applications, a vehicle rendering command, and the like. Here, the vehicle applications include an operating system for a computer, a navigation application, an audio application, and the like for displaying images on the plurality of displays 10. The vehicle rendering command is a command for requesting display control device 30 to render a vehicle-application image from the vehicle application. The vehicle-application image is an image of an operating system, an image of a navigation application, an image of an audio application, or the like in external terminal 100.

First storage 21 includes a primary storage device such as a random access memory (RAM) and a read only memory (ROM). First storage 21 may include a secondary storage device such as a hard disk drive (HDD) or a solid state drive (SSD) and may include a tertiary storage device such as an optical disk or an SD card.

[Communicator 22]

Communicator 22 is, for example, a communication interface provided in vehicle 1 and enables communication between vehicle 1 and external terminal 100. Communicator 22 receives, from external terminal 100, a display request, a use request, a terminal-application image, and the like. Communicator 22 transmits, to external terminal 100, a permission for using of display region 10a, an output request for outputting of display information, or the like. Communicator 22 may be included in constituent components of display control device 30.

[Display Control Device 30]

Display control device 30 is used in vehicle 1 provided with a plurality of displays 10 each including one or more display regions 10a. When display control device 30 obtains a terminal-application image from external terminal 100 and obtains a vehicle-application image from first storage 21, display control device 30 generates images to be displayed on display regions 10a of displays 10 based on the terminal-application image and the vehicle-application image obtained. Thus, display control device 30 can cause displays 10 to display the images generated.

Specifically, display control device 30 includes second storage 31, display region manager 32, display controller 33, control event generator 35, and display screen generator 34.

[Second Storage 31 of Display Control Device 30]

Second storage 31 stores a management table. The management table is a table created beforehand. The management table is, for example, a table including display region information on all display regions 10a set in vehicle 1.

Second storage 31 includes a primary storage device such as a RAM and a ROM. Second storage 31 may include a secondary storage device such as an HDD or an SSD and may include a tertiary storage device such as an optical disk or an SD card.

Display control device 30 need not include second storage 31. In this case, display control device 30 may obtain the management table from an external device.

[Display Region Manager 32 of Display Control Device 30]

Display region manager 32 manages the plurality of displays 10, that is, the plurality of display regions 10a. Specifically, when display region manager 32 obtains a display request from external terminal 100, display region manager 32 reads the management table from second storage 31 and creates a display region table as illustrated in FIG. 3 using the management table read. FIG. 3 is a diagram illustrating an example of a display region table.

Here, the display region table collectively indicates display region information that is information on at least one display region 10a. That is, the display region table includes at least one display region information item. The display region information includes, for each of the at least one display region 10a, an identifier, a position, a size, a display mode, presence or absence of an input and an output for information, and a use condition. Examples of the information include a vehicle-application image, a terminal-application image, a terminal rendering command, a vehicle rendering command, display information, and an event.

The identifier of display region 10a is a unique identifier with which display region 10a can be identified. The position of display region 10a is a position of display 10 disposed in vehicle 1 and a position at which display region 10a is displayed on a screen of display 10 disposed in vehicle 1. The size of display region 10a is a size of display region 10a within which display region 10a can be displayed on the screen of display 10. The display mode of display region 10a includes an exclusive display mode, a message display mode, an overlap display mode, and an event driven mode. The modes will be described later in detail. The presence or absence of an input and an output for information is, for example, presence or absence of a terminal for an input and an output for information. The use condition of display region 10a has a setting for an arbitrary application and a setting for an authenticated application. For the arbitrary application, such a setting that any external terminal 100 can use display region 10a is provided. For the authenticated application, such a setting that only external terminal 100 having a usage right can use display region 10a is provided. For example, by registering external terminal 100 having the usage right beforehand, external terminal 100 registered can use display region 10a to which the authenticated application is set.

For example, identifier A of display region 10a is associated with a position of display region 10a (Cluster center), a size of display region 10a (600×400), a display mode of display region 10a (Exclusive display mode), presence or absence of an input and an output for information (Absent), and a use condition of display region 10a (Arbitrary application).

For example, identifier B of display region 10a is associated with a position of display region 10a (Cluster bottom), a size of display region 10a (800×500), a display mode of display region 10a (Event driven mode), presence or absence of an input and an output for information (Absent), and a use condition of display region 10a (Authenticated application).

For example, identifier C of display region 10a is associated with a position of display region 10a (IVI top), a size of display region 10a (1200×200), a display mode of display region 10a (Message display mode), presence or absence of an input and an output for information (Absent), and a use condition of display region 10a (Arbitrary application).

For example, identifier D of display region 10a is associated with a position of display region 10a (IVI Center), a size of display region 10a (1200×1000), a display mode of display region 10a (Event driven mode), presence or absence of an input and an output for information (Present), and a use condition of display region 10a (Arbitrary application).

For example, identifier E of display region 10a is associated with a position of display region 10a (IVI Center), a size of display region 10a (300×300), a display mode of display region 10a (Overlap display mode), presence or absence of an input and an output for information (Absent), and a use condition of display region 10a (Authenticated application).

It should be noted that the display region table illustrated in FIG. 3 is merely an example. The display region table is not limited to the data described above.

Display region manager 32 may extract only one or more display regions 10a allowed to be used to create the display region table or may extract display regions 10a selected to be used by external terminal 100 to create the display region table.

For example, display region manager 32 may extract only one or more display regions 10a allowed to be used from the plurality of display regions 10a in the management table in second storage 31 and may create the display region table collectively indicating only the display region information on the one or more display regions 10a extracted. That is, display region manager 32 may create a display region table from which one or more display regions 10a that are not allowed to be used when a display request is issued, are excluded from the plurality of display regions 10a.

When display region manager 32 obtains, from external terminal 100, one or more identifiers of one or more display regions 10a selected to be used by external terminal 100 together with a display request, display region manager 32 may extract one or more display regions 10a selected to be used by external terminal 100 from the plurality of display regions 10a in the management table in second storage 31 and may create a display region table collectively indicating the display region information on the one or more display regions 10a extracted. That is, when display region manager 32 obtains one or more identifiers of one or more display regions 10a selected to be used by external terminal 100 when a display request is issued, display region manager 32 may create a display region table collectively indicating display region information on all display regions 10a that satisfy selection of using by external terminal 100.

Next, after creating the display region table, display region manager 32 outputs the display region table created as a response to the display request from external terminal 100, to external terminal 100 via communicator 22.

After outputting the display region table to external terminal 100, display region manager 32 obtains, from external terminal 100, a use request for permission to use one or more display regions 10a selected to be used by external terminal 100 based on the display region table. That is, after outputting the display region table created to external terminal 100, display region manager 32 obtains, as a response to the output, a use request for permission to use the one or more display regions 10a selected by external terminal 100 based on the display region table, from external terminal 100. In this case, display region manager 32 determines whether or not the one or more display regions 10a requested by the use request are allowed to be used. Here, when determining that the one or more display regions 10a are allowed to be used, display region manager 32 permits external terminal 100 for which the one or more display regions 10a are determined to be allowed to be used, to use the one or more display regions 10a selected by external terminal 100, that is, permits an application of external terminal 100 to use the one or more display regions 10*a*. When determining that the one or more display regions 10*a* are not allowed to be used, display region manager 32 does not permit external terminal 100 for which the one or more display regions 10*a* are determined not to be allowed to be used, to use the one or more display regions 10*a* selected by external terminal 100, that is, does not permit the application of external terminal 100 to use the one or more display regions 10*a*.

Here, a case where display region manager 32 permits external terminal 100 to use one or more display regions 10*a* will be simply exemplified.

For example, display region manager 32 may determine that one or more display regions 10*a* are allowed to be used in response to a use request that is obtained first. Display region manager 32 then may permit external terminal 100 that has issued the use request for which the one or more display regions 10*a* are determined to be allowed to be used, to use one or more display regions 10*a* selected by external terminal 100. The use request obtained first means, for example, a use request that is obtained first since a time point at which display region manager 32 first transmits the display region table.

Display region manager 32 may determine, in response to the use request, that one or more display regions 10*a* are allowed to be used only by external terminal 100 to which a usage right has been granted beforehand. Display region manager 32 then may permit external terminal 100 that has issued the use request for which the one or more display regions 10*a* are determined to be allowed to be used, to use one or more display regions 10*a* selected by external terminal 100. Here, external terminal 100 to which a usage right has been granted means that the usage right has been granted to a terminal application that is an application used by external terminal 100.

Display region manager 32 may determine that one or more display regions 10*a* are allowed to be used in response to a use request obtained from a device to which a preferential usage right has been granted beforehand. Display region manager 32 then may preferentially permit the device that has issued the use request for which the one or more display regions 10*a* are determined to be allowed to be used, to use display regions 10*a* selected by the device to which a preferential usage right has been granted. Here, the device includes a device provided in vehicle 1 other than external terminal 100, display control device 30, and display control device 30. The device to which the preferential usage right has been granted means that an application used by the device has the preferential usage right.

In a case where display region manager 32 obtains a plurality of use requests, display region manager 32 may determine, in response to a use request for display region 10*a* associated with a use that is most similar to a use of a display mode associated with display region 10*a* among the plurality of use requests, that display region 10*a* is allowed to be used. Display region manager 32 then may permit external terminal 100 that has issued the use request for which the one or more display regions 10*a* are determined to be allowed to be used, to use one or more display regions 10*a* selected by external terminal 100.

Display region manager 32 may determine, in response to a use request obtained from external terminal 100 having a highest priority degree among a plurality of use requests obtained from a plurality of external terminals 100, that one or more display regions 10*a* are allowed to be used. Display region manager 32 then may permit external terminal 100 that has issued the use request for which the one or more display regions 10*a* are determined to be allowed to be used, to use one or more display regions 10*a* selected by external terminal 100. Such a priority degree with which one or more display regions 10*a* are preferentially allowed to be used is set beforehand to each of the plurality of external terminals 100 and each of applications of the plurality of external terminals 100.

After display region manager 32 permits external terminal 100 to use the one or more display regions 10*a* in this manner, external terminal 100 can start to use the one or more display regions 10*a* for which the use request has been issued. After display region manager 32 permits the using of one or more display regions 10*a*, display region manager 32 outputs, to display controller 33, using information on the one or more display regions 10*a* of which the using is permitted. Here, the using information on the one or more display regions 10*a* includes, for each of the one or more display regions 10*a*, display modes and presence or absence of an input and an output for information.

[Display Controller 33 of Display Control Device 30]

In accordance with the using information on the one or more display regions 10*a* obtained from display region manager 32, display controller 33 issues an instruction to control event generator 35 and display screen generator 34.

Specifically, when obtaining the using information on one or more display regions 10*a*, display controller 33 issues the instruction to display screen generator 34 such that the one or more display regions 10*a* indicated by the using information and the display mode according to the using information are executed. Here, the one or more display regions 10*a* indicated by the using information are one or more display regions 10*a* which display region manager 32 has permitted external terminal 100 to use. When display controller 33 executes the event driven mode being a display mode, display controller 33 issues an instruction to control event generator 35 and display screen generator 34.

[Control Event Generator 35 of Display Control Device 30]

For example, an application may be using display region 10*a* to which the event driven mode is set in the display region table. Therefore, in a case where external terminal 100 is to use such display region 10*a*, external terminal 100 does not know a timing to issue a display request and a use request. Thus, to inform external terminal 100 of a time period during which display region 10*a* is allowed to be used, control event generator 35 issues an output request for outputting of display information to external terminal 100 when a preset event occurs. Here, the preset event is an event indicating that the application finishes the using of display region 10*a*.

This will be described with a specific example. In a case where an application having a preferential usage right is not using display region 10*a*, control event generator 35 obtains an instruction about the execution of the event driven mode from display controller 33. That is, when the application having the preferential usage right finishes the using of display region 10*a*, control event generator 35 issues an output request for outputting of display information to external terminal 100 in response to the instruction from display controller 33. By obtaining the output request for outputting of display information, external terminal 100 can recognize a timing to use display region 10*a* and thus can output the display information including a terminal-application image.

[Display Screen Generator 34 of Display Control Device 30]

When display screen generator 34 obtains the instruction from display controller 33, display screen generator 34 causes the plurality of displays 10 to display images.

Specifically, in a case where display region manager 32 permits external terminal 100 to use one or more display regions 10a selected by external terminal 100, display screen generator 34 obtains, from external terminal 100, display information including information to be displayed on one or more display regions 10a selected by external terminal 100. Here, as described above, the display information includes a terminal rendering command, a terminal-application image, and terminal text information including a text message from external terminal 100. The terminal-application image and the terminal text information are an example of the information to be displayed on the one or more display regions 10a. The terminal rendering command is a command to request display control system 2 to render terminal-application images to be displayed on the one or more display regions 10a for which a use request has been issued to display control system 2.

Display screen generator 34 also obtains, from first storage 21, a vehicle rendering command and a vehicle-application image of a vehicle application that corresponds to display region 10a selected by external terminal 100.

Thus, display screen generator 34 combines together the terminal-application image of the display information and the vehicle-application image of the vehicle application obtained from external terminal 100. At this time, display screen generator 34 combines the terminal-application image and the vehicle-application image together in accordance with display modes that are preset to display region 10a.

Here, as described above, the display modes each include the exclusive display mode, the message display mode, the overlap display mode, and the event driven mode.

The exclusive display mode is a mode in which external terminal 100 permitted to use display region 10a can exclusively use display region 10a. In the exclusive display mode, while external terminal 100 is using display region 10a, another external terminal 100 is not permitted to interrupt.

The message display mode is a mode in which display region 10a for displaying a character string can be used. In the message display mode, an image of a character string generated from the terminal text information is displayed on display region 10a.

The overlap display mode is a mode in which display region 10a capable of displaying an overlapped image can be used with a setting of a parameter relating to overlapping such as a transparency of the image. In the overlap display mode, a semitransparent image is displayed on display region 10a.

The event driven mode is a mode in which display region 10a is not allowed to be used while an application having a preferential usage right is using display region 10a, and display region 10a is allowed to be used when the application having a preferential usage right does not use display region 10a.

In the event driven mode, when an application having a preferential usage right does not use display region 10a, external terminal 100 can use display region 10a in which the event driven mode is executed, by issuing an output request for outputting of display information to external terminal 100. Specifically, in display control device 30, a display mode associated with a preset event, that is, the event driven mode may be executed. In this case, display screen generator 34 obtains, external terminal 100, the display information in response to the output request for outputting of the display information from control event generator 35. Thus, display screen generator 34 renders an image of the obtained display information and the like in accordance with the event driven mode being a display mode. Display screen generator 34 displays rendered image information on the plurality of displays 10.

In the event driven mode, even while external terminal 100 is using display region 10a, an application having a preferential usage right can use display region 10a being used by external terminal 100 in an interrupting manner. In this case, external terminal 100 is made to temporarily stop the using of display region 10a.

In this manner, by combining the terminal-application image and the vehicle-application image together in accordance with one of these display modes, display screen generator 34 can generate a single image in which the terminal-application image is rendered at a position corresponding to display region 10a selected by external terminal 100. By outputting the generated image to display 10 corresponding to display region 10a which external terminal 100 is permitted to use, display screen generator 34 can cause display 10 to display the generated image.

Processing Operation

Next, processing operation of display control device 30, display control system 2, a display control method, and a non-transitory computer-readable recording medium having a computer program recorded thereon, in the present embodiment will be described.

Operation Example 1

In the present operation example, a processing operation from external terminal 100 issuing a display request and a use request to display control system 2 until external terminal 100 obtaining notification of permission for using of one or more display regions 10a for which the use request has been issued will be described with reference to FIG. 4.

FIG. 4 is a sequence diagram illustrating an example of a processing operation between display control system 2 and external terminal 100 according to the embodiment.

First, when external terminal 100 is to use one or more display regions 10a included in a plurality of display regions 10a, external terminal 100 issues a display request to display control system 2 (S11). Thus, the display request is issued to display control system 2 from external terminal 100. When external terminal 100 issues the display request to display control system 2, external terminal 100 can also notify display control system 2 of one or more identifiers of the one or more display regions 10a selected to be used.

Next, display control system 2 obtains the display request from external terminal 100. Specifically, display region manager 32 of display control system 2 obtains the display request from external terminal 100 via communicator 22. When obtaining the display request, display region manager 32 reads a management table in second storage 31. Display region manager 32 creates a display region table using the management table read (S21).

Specifically, display region manager 32 may extract only display region information items allowed to be used from a plurality of display region information items in the management table and may create a display region table that includes only the display region information items extracted. In this case, the display region table excludes display region information on one or more display regions 10a that are not allowed to be used when a display request is issued. When display region manager 32 obtains, from external terminal 100, one or more identifiers of one or more display regions 10a selected to be used by external terminal 100 together with a display request, display region manager 32 may extract only one or more display regions 10a selected to be used by external terminal 100 from a plurality of display regions 10a in the management table and may create a display region table collectively indicating the display region information on the one or more display regions 10a extracted.

Next, display region manager 32 outputs the display region table created to external terminal 100 via communicator 22 (S22).

Next, when external terminal 100 obtains the display region table from display control system 2, external terminal 100 selects one or more display regions 10a to be used from among the plurality of display regions 10a based on the display region table (S12).

Next, external terminal 100 issues, to display control system 2, a use request for permission to use the one or more display regions 10a that are selected to use (S13).

Next, display control system 2 obtains the use request for permission to use the one or more display regions 10a from external terminal 100. Display region manager 32 of display control system 2 determines whether or not the one or more display regions 10a requested by the use request are allowed to be used (S23). When determining that the one or more display regions 10a are allowed to be used, display region manager 32 permits external terminal 100 for which the one or more display regions 10a are determined to be allowed to be used, to use the one or more display regions 10a selected by external terminal 100. The sequence diagram in FIG. 4 illustrates a case of permitting the using of the one or more display regions 10a selected by external terminal 100 is exemplified.

Here, a case where display region manager 32 permits external terminal 100 to use one or more display regions 10a will be specifically described.

First, display region manager 32 may determine that the one or more display regions 10a are allowed to be used in response to a use request that is obtained first and may permit external terminal 100 that has issued the use request for which the one or more display regions 10a are determined to be allowed to be used, to use the one or more display regions 10a selected by external terminal 100. That is, when display region manager 32 obtains the first use request after outputting the display region table created to external terminal 100, display region manager 32 may permit external terminal 100 that has issued the first use request to use the one or more display regions 10a selected by external terminal 100. In this case, display region manager 32 may notify, via communicator 22, external terminal 100 that has issued the first use request, of the permission for using.

Next, display region manager 32 may determine, in response to a use request, that the one or more display regions 10a are allowed to be used only by external terminal 100 to which a usage right has been granted beforehand, and may permit external terminal 100 that has issued the use request for which the one or more display regions 10a are determined to be allowed to be used, to use the one or more display regions 10a selected by external terminal 100. That is, when a use request has been issued by external terminal 100 to which the usage right has been granted, display region manager 32 may permit only external terminal 100 to which the usage right has been granted to use display region 10a selected by external terminal 100. In this case, display region manager 32 may notify, via communicator 22, external terminal 100 to which the usage right has been granted, of the permission for using.

Next, display region manager 32 may determine that the one or more display regions 10a are allowed to be used in response to a use request obtained from a device to which a preferential usage right has been granted beforehand, and may preferentially permit external terminal 100 that has issued the use request for which the one or more display regions 10a are determined to be allowed to be used, to use the one or more display regions 10a selected by the device to which the preferential usage right has been granted. That is, when a use request has been issued by the device having the preferential usage right, display region manager 32 may permit the device having the preferential usage right preferentially to use the one or more display regions 10a selected by the device even when the one or more display regions 10a have already been used by another device. In this case, display region manager 32 may notify, via communicator 22, the device having the preferential usage right, of the permission for using. In addition, display region manager 32 temporarily does not allow display region 10a used by the other device to be used. Thus, the other device is forced to temporarily stop the one or more display regions 10a being used.

Next, the plurality of display regions 10a may be associated with uses of the plurality of display regions 10a beforehand. In this case, when display region manager 32 obtains a plurality of use requests, display region manager 32 may determine, in response to a use request for display region 10a associated with a use that is most similar to a use of a display mode associated with display region 10a among the plurality of use requests, that display region 10a is allowed to be used, and may permit external terminal 100 that has issued the use request for which display region 10a is determined to be allowed to be used, to use display region 10a selected by external terminal 100. That is, display region manager 32 checks uses of a plurality of external terminals 100 that have issued the use requests against a use that is associated beforehand with display region 10a selected by external terminals 100, thus extracting the use request for display region 10a associated with a use that is most similar to the use of the display mode associated with display region 10a. Display region manager 32 then may permit external terminal 100 that has issued the use request for display region 10a associated with a use that is most similar to the use of display region 10a with which the display mode is associated, to use display region 10a with which the display mode is associated. In this case, display region manager 32 may notify, via communicator 22, external terminal 100 that has issued the use request for display region 10a associated with a use that is most similar to the use of display region 10a with which the display mode is associated, of the permission for using.

The use of each display region 10a may be associated in accordance with the display mode. For example, as the use of display region 10a, a use suitable for displaying a text message such as mail, a use suitable for displaying a warning sign, a use suitable for overlapped displaying, a use suitable for displaying an image of a navigation application, a use suitable for displaying an image of an audio application, and the like may be set to display region 10a in accordance with the display mode. Display region 10a associated with the exclusive display mode may be set such that display region 10a can support all of the uses.

Next, the plurality of external terminals 100 each may have been preset with a priority degree based on which one or more display regions 10a are preferentially determined to be allowed to be used. In this case, display region manager 32 may determine that one or more display regions 10a are allowed to be used in response to a use request obtained from external terminal 100 having a highest priority degree among use requests obtained from the plurality of external terminals 100 and may permit external terminal 100 that has issued the use request for which the one or more display regions 10a are determined to be allowed to be used, to use the one or more display regions 10a selected by external terminal 100. That is, display region manager 32 may permit external terminal 100 having the highest priority degree among priority degrees of the plurality of external terminals 100 that have issued the use requests, to use the one or more display regions 10a. In this case, display region manager 32 may notify, via communicator 22, external terminal 100 having the highest priority degree among the plurality of external terminals 100 that have issued the use requests, of the permission for using.

After permitting in this manner the using of the one or more display regions 10a selected by external terminal 100, display region manager 32 outputs using information on the one or more display regions 10a of which the using is permitted, to display controller 33.

On the other hand, when determining that the one or more display regions 10a are not allowed to be used, display region manager 32 does not permit external terminal 100 for which the one or more display regions 10a are determined not to be allowed to be used, to use the one or more display regions 10a selected by external terminal 100. In this case, display region manager 32 may finish the processing operation illustrated in the sequence diagram in FIG. 4. In addition, display region manager 32 may notify, via communicator 22, external terminal 100 that the one or more display regions 10a selected by external terminal 100 are not allowed to be used.

Next, display controller 33 obtains, from display region manager 32, the using information on the one or more display regions 10a which display region manager 32 permits external terminal 100 to use, thus executing preparation to start using (S24).

Specifically, when obtaining the using information on the one or more display regions 10a, display controller 33 executes the preparation to start using by issuing an instruction to display screen generator 34 such that the one or more display regions 10a indicated by the using information and the display mode according to the using information are executed. In addition, when display controller 33 executes the event driven mode being a display mode, display controller 33 executes the preparation to start using by issuing an instruction to control event generator 35 and display screen generator 34.

Next, display region manager 32 notifies, external terminal 100 of the permission for using the one or more display regions 10a selected by external terminal 100 (S25).

Thus, when external terminal 100 obtains the notification of the permission for using from display control system 2, external terminal 100 can start the using of the one or more display regions 10a that are selected by external terminal 100 and which external terminal 100 is permitted to use.

Next, the following operation example will describe a case where display information obtained is rendered in accordance with a display mode by display control device 30 executing the display mode after obtaining, display control system 2, the notification of the permission for using the one or more display regions 10a selected by external terminal 100.

Operation Example 2: Exclusive Display Mode

In the present operation example, a processing operation in which display control system 2 executes the exclusive display mode as a display mode will be described with reference to FIG. 5.

Figure 5:
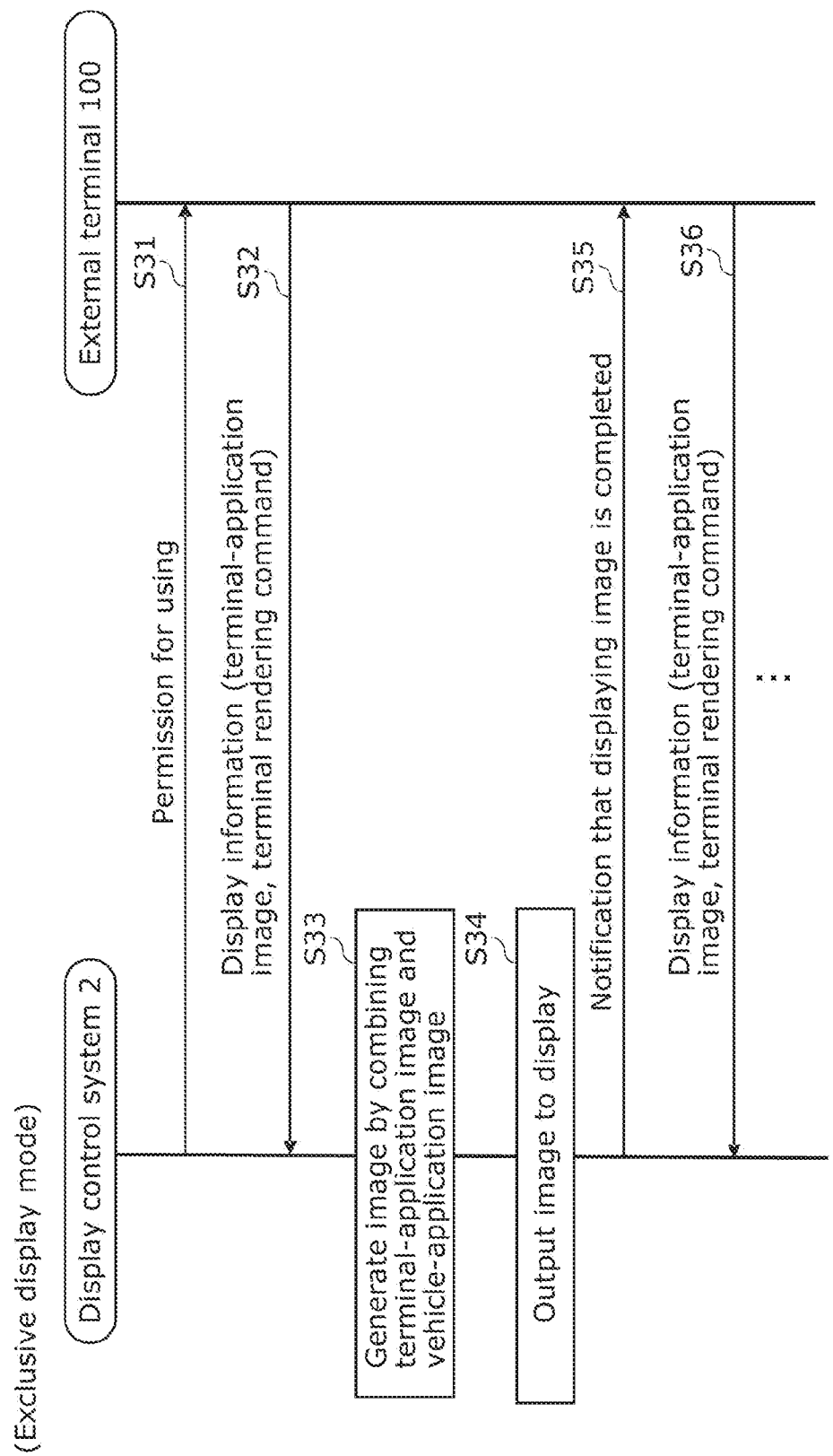
FIG. 5 is a sequence diagram illustrating an example of a processing operation between the display control system executing an exclusive display mode and the external terminal.

FIG. 5 is a sequence diagram illustrating an example of a processing operation between display control system 2 executing the exclusive display mode and external terminal 100.

In the present operation example, a case where a terminal-application image is displayed on display region A will be exemplified. Display controller 33 executes the exclusive display mode, which is a display mode that has been preset to display region A, that is, a display mode that has been associated with display region A.

First, external terminal 100 obtains a notification of permission for using from display control system 2 (S31).

Next, external terminal 100 transmits, to display control system 2, display information that includes a terminal-application image to be displayed on display region A selected by external terminal 100 in S12 of Operation example 1 and includes a terminal rendering command (S32).

Next, display screen generator 34 obtains the display information from external terminal 100 via communicator 22. Display screen generator 34 also obtains, from first storage 21, a vehicle rendering command and a vehicle-application image of a vehicle application that corresponds to display region A selected by external terminal 100. Thus, display screen generator 34 generates an image by combining together the terminal-application image of the display information and the vehicle-application image from the vehicle application obtained from external terminal 100 (S33). That is, by combining the terminal-application image and the vehicle-application image together, display screen generator 34 can generate a single image in which the terminal-application image is rendered at a position corresponding to display region A selected by external terminal 100.

Next, display screen generator 34 outputs the generated single image to display 10 corresponding to display region A which external terminal 100 is permitted to use (S34). Thus, the generated single image is displayed as the display data on display 10, and the terminal-application image rendered is displayed as the display data on display region A which external terminal 100 is permitted to use.

Next, display screen generator 34 notifies external terminal 100 that the display of the images has been completed by rendering (S35).

In a case where external terminal 100 is to further display another terminal-application image, external terminal 100 may repeat the processing of step S32 and subsequent steps (S36).

Operation Example 3: Message Display Mode

In the present operation example, a processing operation in which display control system 2 executes the message display mode as a display mode will be described with reference to FIG. 6.

Figure 6:
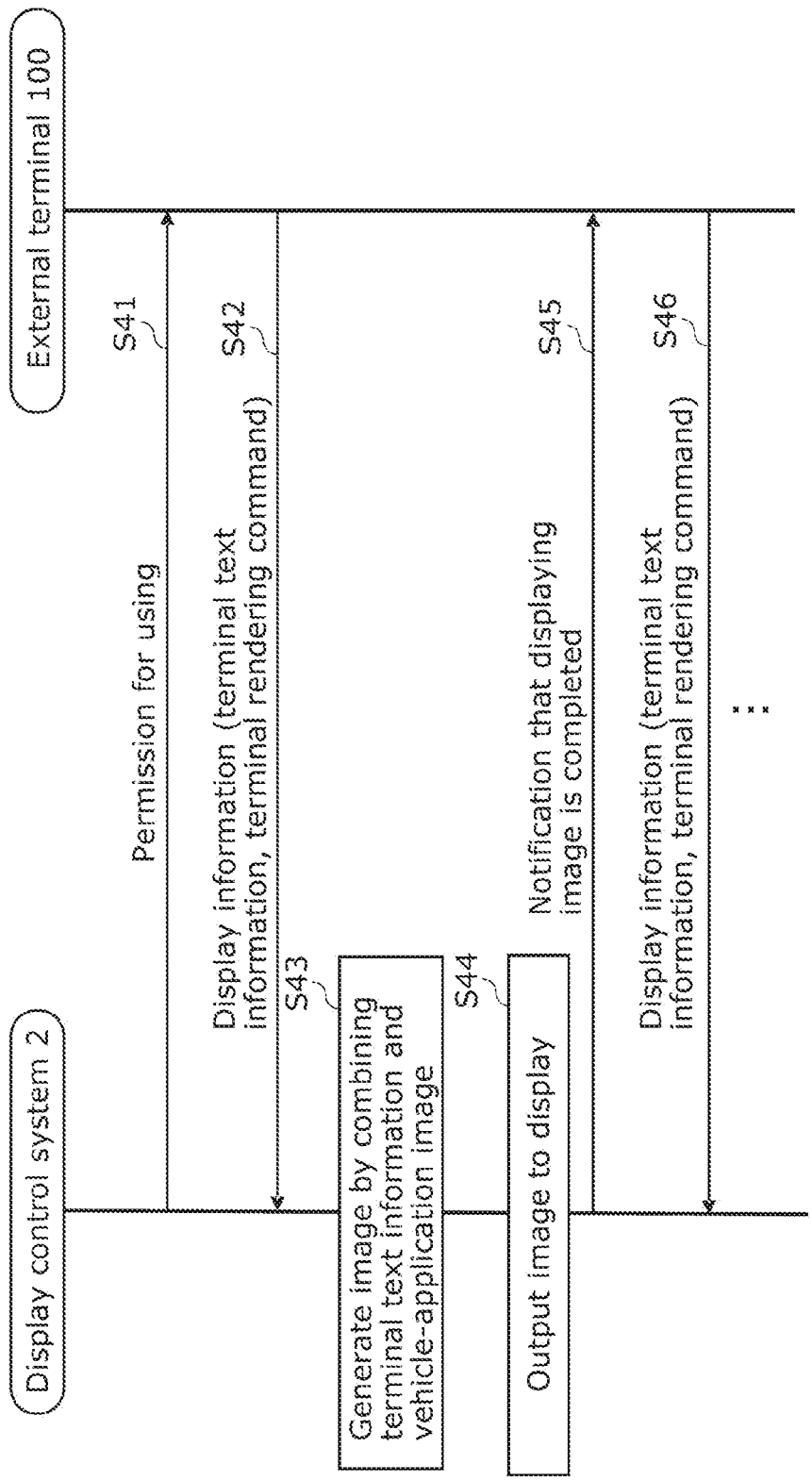
FIG. 6 is a sequence diagram illustrating an example of a processing operation between the display control system executing a message display mode and the external terminal.

FIG. 6 is a sequence diagram illustrating an example of a processing operation between display control system 2 executing the message display mode and external terminal 100.

In the present operation example, a case where terminal text information is displayed on display region C will be exemplified. Display controller 33 executes the message display mode, which is a display mode that has been preset to display region C, that is, a display mode that has been associated with display region C.

First, external terminal 100 obtains a notification of permission for using from display control system 2 (S41).

Next, external terminal 100 transmits, to display control system 2, display information that includes the terminal text information to be displayed on display region C selected by external terminal 100 in S12 of Operation example 1 and includes a terminal rendering command (S42). Here, the terminal text information includes a text message and a limit on the number of characters.

Next, display screen generator 34 receives the display information from external terminal 100 via communicator 22. Display screen generator 34 also obtains, from first storage 21, a vehicle rendering command and a vehicle-application image of a vehicle application that corresponds to display region C selected by external terminal 100. Thus, display screen generator 34 generates an image by combining together the terminal text information of the display information and the vehicle-application image from the vehicle application obtained from external terminal 100 (S43). That is, by combining the terminal text information and the vehicle-application image together, display screen generator 34 can generate a single image in which the terminal text information is rendered at a position corresponding to display region C selected by external terminal 100.

Next, display screen generator 34 outputs the generated single image to display 10 corresponding to display region C which external terminal 100 is permitted to use (S44). Thus, the generated single image is displayed as the display data on display 10, and the terminal text information rendered is displayed as the display data on display region C which external terminal 100 is permitted to use.

Next, display screen generator 34 notifies external terminal 100 that the display of the images has been completed by rendering (S45).

In a case where external terminal 100 is to further display another terminal text information item, external terminal 100 may repeat the processing of step S42 and subsequent steps (S46).

Operation Example 4: Overlap Display Mode

In the present operation example, a processing operation in which display control system 2 executes the overlap display mode as a display mode will be described with reference to FIG. 7.

FIG. 7 is a sequence diagram illustrating an example of a processing operation between display control system 2 executing the overlap display mode and external terminal 100.

In the present operation example, a case where a terminal-application image is displayed on display region E will be exemplified. Display controller 33 executes the overlap display mode, which is a display mode that has been preset to display region E, that is, a display mode that has been associated with display region E.

First, external terminal 100 obtains a notification of permission for using from display control system 2 (S51).

Next, external terminal 100 outputs, to display control system 2, a parameter relating to overlapping for setting a transparency and the like of the terminal-application image to be displayed on display region E (S52).

Next, display screen generator 34 obtains the parameter relating to overlapping via communicator 22. At this time, display screen generator 34 determines whether or not the parameter relating to overlapping is executable. When the parameter is executable, display screen generator 34 sets the parameter relating to overlapping obtained (S53). When the parameter is not executable, display screen generator 34 may notify, via communicator 22, external terminal 100 that the parameter is not executable.

Next, when the parameter relating to overlapping is successfully set, display screen generator 34 notifies external terminal 100 that the setting of the parameter is completed (S54).

Next, external terminal 100 transmits, to display control system 2, display information that includes a terminal-application image to be displayed on display region E selected by external terminal 100 in S12 of Operation example 1 and includes a terminal rendering command (S55).

Next, display screen generator 34 obtains the display information from external terminal 100 via communicator 22. Display screen generator 34 also obtains, from first storage 21, a vehicle rendering command and a vehicle-application image of a vehicle application that corresponds to display region E selected by external terminal 100. In addition, display screen generator 34 makes the terminal-application image of the display information obtained from external terminal 100 semitransparent based on the parameter relating to overlapping. Thus, display screen generator 34 generates an image by combining together the terminal-application image made semitransparent based on the parameter and the vehicle-application image from the vehicle application (S56). That is, by combining the semitransparent terminal-application image and the vehicle-application image together, display screen generator 34 can generate a single image in which the terminal-application image made semitransparent is rendered at a position corresponding to display region E selected by external terminal 100.

Next, display screen generator 34 outputs the generated single image to display 10 corresponding to display region E which external terminal 100 is permitted to use (S57). Thus, the generated single image is displayed as the display data on display 10, and the semitransparent terminal-application image rendered is displayed as the display data on display region E which external terminal 100 is permitted to use.

Next, display screen generator 34 notifies external terminal 100 that the display of the images has been completed by rendering (S58).

In a case where external terminal 100 is to further display another terminal-application image, external terminal 100 may repeat the processing of step S55 and subsequent steps (S59).

In the overlap display mode, display control system 2 may set the parameter relating to overlapping. In this case, processing in step S52 may be omitted.

Operation Example 5: Event Driven Mode

In the present operation example, a processing operation in which display control system 2 executes the event driven mode as a display mode will be described with reference to FIG. 8.

FIG. 8 is a sequence diagram illustrating an example of a processing operation between display control system 2 executing the event driven mode and external terminal 100.

In the present operation example, a case where a terminal-application image is displayed on display regions B and D will be exemplified. Display controller 33 executes the event driven mode, which is a display mode that has been preset to display regions B and D, that is, a display mode that has been associated with display regions B and D.

First, external terminal 100 obtains a notification of permission for using from display control system 2 (S61).

Next, when a preset event occurs, display controller 33 of display control system 2 issues an instruction to control event generator 35. The preset event is an event that occurs when external terminal 100 becomes able to use display regions B and D. Display controller 33 obtains such an event from a vehicle application or the like. When obtaining the instruction from display controller 33, control event generator 35 issues an output request for outputting of display information to external terminal 100 (S62).

Next, when obtaining the notification of permission for using and the output request for outputting of display information, external terminal 100 transmits, to display control system 2, display information that includes a terminal-application image to be displayed on display regions B and D selected by external terminal 100 in S12 of Operation example 1 and includes a terminal rendering command (S63).

Next, display screen generator 34 obtains the display information from external terminal 100 via communicator 22. Display screen generator 34 also obtains, from first storage 21, a vehicle rendering command and a vehicle-application image of a vehicle application that corresponds to display regions B and D selected by external terminal 100. Thus, display screen generator 34 generates an image by combining together the terminal-application image of the display information and the vehicle-application image from the vehicle application obtained from external terminal 100 (S64). That is, by combining the terminal-application image and the vehicle-application image together, display screen generator 34 can generate a single image in which the terminal-application image is rendered at positions corresponding to display regions B and D selected by external terminal 100.

Next, display screen generator 34 outputs the generated single image to display 10 corresponding to display regions B and D which external terminal 100 is permitted to use (S65). Thus, the generated single image is displayed as the display data on display 10, and the terminal-application image rendered is displayed as the display data on display regions B and D which external terminal 100 is permitted to use.

Next, display screen generator 34 notifies external terminal 100 that the display of the images has been completed by rendering (S66).

In a case where external terminal 100 is to further display another terminal-application image, external terminal 100 may repeat the processing of step S63 and subsequent steps (S67).

For display regions B and D being used by external terminal 100, there may be an event occurring for temporarily using by a vehicle application. The vehicle application is an application to which a preferential usage right has been granted and thus can preferentially use display regions B and D being already used. Thus, the vehicle application displays an image corresponding to the event occurring on display regions B and D, and external terminal 100 stops displaying the terminal-application image on display regions B and D. Here, the image corresponding to the event is, for example, a warning sign in vehicle 1.

Next, display control system 2 notifies external terminal 100 of a rendering pending request (S68).

Next, when external terminal 100 obtains the rendering pending request, external terminal 100 enters a waiting state for using display regions B and D. When the waiting state for using is canceled, external terminal 100 can display the terminal-application image on display regions B and D again.

Actions and Effects

Next, actions and effects of display control device 30, display control system 2, a display control method, and a non-transitory computer-readable recording medium having a computer program stored thereon, in the present embodiment will be described.

In the on-vehicle system according to patent document 1, displaying application software information on a display area depends on an application of the mobile terminal device. Therefore, the on-vehicle system supports limited applications, which may cause the displaying to be performed improperly. In addition, the on-vehicle system allocates application software information items to specific display areas. Therefore, rendering can be performed only on the display areas that are one-sidedly determined by the on-vehicle system, limiting a degree of freedom in expression in the plurality of display areas in a car interior.

In addition, in the apparatus according to Patent Literature 2, settings for displaying information on regions in one or more displays are made by a user. This requires the user to make detailed settings and the like of the region to display the information, thus decreasing operability.

As described above, display control device 30 according to Embodiment for use in vehicle 1 provided with a plurality of displays 10 each including one or more display regions 10a includes: display region manager 32 that manages a plurality of display regions 10a that are the one or more display regions 10a included in each of the plurality of displays 10, wherein when display region manager 32 obtains, from external terminal 100, a display request for displaying display data on display region 10a included in the plurality of display regions 10a, display region manager 32:

creates a display region table collectively indicating display region information on at least one display region 10a among the plurality of display regions 10a; and outputs the display region table created to external terminal 100.

Accordingly, display region manager 32 can create the display region table collectively indicating information on at least one display region 10a and output the display region table to external terminal 100. Therefore, external terminal 100 can select desired one or more display regions 10a from display region information indicated by the display region table. Thus, the one or more display regions 10a selected by external terminal 100 can display the display data from external terminal 100 (the terminal-application image, the terminal text information, etc.).

According to Embodiment, the user does not need to perform setting for displaying data on a desired display region by operating the display control device and the external terminal, which is necessary in the related arts. Therefore, display control device 30 according to Embodiment prevents the user's operability from being deteriorated.

Therefore, display control device 30 can display the display data from external terminal 100 on one or more display regions 10a of vehicle 1 appropriately and freely and can prevent a decrease in operability for a user.

Furthermore, display control system 2 according to Embodiment includes: display control device 30 and plurality of displays 10.

Display control system 2 having this configuration also exhibits the same actions and effects as described above.

A display control method according to Embodiment for use in vehicle 1 provided with a plurality of displays 10 each including one or more display regions 10a includes: managing a plurality of display regions 10a that are the one or more display regions 10a included in each of plurality of displays 10; when a display request for displaying of display data on display region 10a included in the plurality of display regions 10a is obtained from external terminal 100, creating a display region table collectively indicating display region information on at least one display region 10a among the plurality of display regions 10a; and outputting the display region table created to external terminal 100.

This display control method also exhibits the same actions and effects as described above.

The recording medium according to Embodiment is a non-transitory computer-readable recording medium having a computer program recorded thereon for causing the computer to execute the display control method.

This recording medium also exhibits the same actions and effects as described above.

In display control device 30 according to Embodiment, display region manager 32: extracts only display region 10a allowed to be used from the plurality of display regions 10a; and creates the display region table collectively indicating only the display region information on display region 10a extracted.

Accordingly, display region 10a allowed to be used can be extracted, and thus it is possible to create a display region table in which one or more display regions 10a not allowed to be used are not included. That is, external terminal 100 can use display region information on only display region 10a allowed to be used, and thus it is possible for display control device 30 to prevent occurrence of such a failure that external terminal 100 selects one or more display regions 10a not allowed to be used. As a result, display control device 30 can prevent occurrence of unnecessary communication between display control device 30 and external terminal 100.

In display control device 30 according to Embodiment, external terminal 100 selects display region 10a to be used from among the plurality of display regions 10a based on the display region table, and issues a use request for permission to use display region 10a selected, and display region manager 32: obtains, from external terminal 100, the use request for display region 10a selected by external terminal 100; determines whether or not display region 10a requested by the use request is allowed to be used; when determining that display region 10a is allowed to be used, permits external terminal 100 for which display region 10a is determined to be allowed to be used, to use display region 10a selected by external terminal 100; and when determining that display region 10a is not allowed to be used, prohibits external terminal 100 for which display region 10a is not determined to be allowed to be used, from using display region 10a selected by external terminal 100.

Accordingly, display region manager 32 can determine whether or not display region 10a selected by external terminal 100 is allowed to be used, in response to a use request for permission to use display region 10a selected by external terminal 100. For example, even when a plurality of external terminals 100 issue use requests for permission to use the same display region 10a, whether or not the same display region 10a is allowed to be used can be determined in an above-described manner. Therefore, display control device 30 can prevent display region manager 32 from permitting the plurality of external terminals 100 to use the same display region 10a.

In display control device 30 according to Embodiment, the display region information includes, for each of the at least one display region 10a, an identifier, a position, a size, a display mode, presence or absence of an input and an output for information, and a use condition.

Accordingly, external terminal 100 can select display data that is suitable for display region information in the display region table. Therefore, display control device 30 can cause at least one display region 10a to display the display data suitable for the display region information.

In display control device 30 according to Embodiment, display region manager 32: creates the display region table collectively indicating the display region information on display region 10a selected to be used by external terminal 100 from among the plurality of display regions 10a; and outputs the display region table created to external terminal 100.

Accordingly, display region manager 32 can create a display region table including display region 10a selected to be used by external terminal 100. Therefore, external terminal 100 can select display region 10a to be used from the display region table. As a result, display control device 30 can display the display data on display region 10a selected to be used by external terminal 100.

In display control device 30 according to Embodiment, display region manager 32: determines that display region 10a is allowed to be used in response to the use request that is obtained first; and permits external terminal 100 that has issued the use request for which display region 10a is determined to be allowed to be used, to use display region 10a selected by external terminal 100.

Accordingly, it is possible to permit only external terminal 100 that has issued the use request obtained first to use display region 10a. Therefore, even when a plurality of external terminals 100 issue use requests for permission to use the same display region 10a, display control device 30 can prevent display region manager 32 from permitting the plurality of external terminals 100 to use the same display region 10a.

In display control device 30 according to Embodiment, display region manager 32: determines, in response to the use request, that display region 10a is allowed to be used only by external terminal 100 to which a usage right has been granted beforehand; and permits external terminal 100 that has issued the use request for which display region 10a is determined to be allowed to be used, to use display region 10a selected by external terminal 100.

Accordingly, in response to the use request, only external terminal 100 to which the usage right has been granted beforehand is permitted to use display region 10a, and thus it is possible to prevent external terminal 100 to which no usage right has been granted from using display region 10a. Therefore, display control device 30 can prevent external terminal 100 from using display region 10a when, for example, a warning sign, a direction indicator, or the like of vehicle 1 is displayed. Therefore, display control device 30 can keep safety of vehicle 1 being traveling.

In display control device 30 according to Embodiment, display region manager 32: determines that display region 10*a* is allowed to be used in response to the use request obtained from a device to which a preferential usage right has been granted beforehand; and preferentially permits the device that has issued the use request for which display region 10*a* is determined to be allowed to be used, to use display region 10*a* selected by the device.

Accordingly, even when external terminal 100 has already used display region 10*a*, the device to which the preferential usage right has been granted can preferentially use display region 10*a* that is being used by external terminal 100. Therefore, when an event relating to vehicle 1 occurs, display control device 30 can preferentially display data corresponding to the event on display region 10*a*. Therefore, display control device 30 can keep safety of vehicle 1 being traveling.

In display control device 30 according to Embodiment, when display region manager 32 obtains a plurality of use requests each being the use request, display region manager 32: determines, in response to a use request for display region 10*a* associated with a use that is most similar to a use of a display mode associated with display region 10*a* among the plurality of use requests, that display region 10*a* is allowed to be used; and permits external terminal 100 that has issued the use request for which display region 10*a* is determined to be allowed to be used, to use display region 10*a* selected by external terminal 100.

Accordingly, display region 10*a* suitable for external terminal 100 can be used. Therefore, display control device 30 can cause at least one display region 10*a* to display the display data suitable for the display region information.

In display control device 30 according to Embodiment, a plurality of external terminals 100 each being external terminal 100 each have been preset with a priority degree based on which display region 10*a* is preferentially determined to be allowed to be used, and display region manager 32: determines, in response to a use request obtained from external terminal 100 having a highest priority degree among a plurality of use requests obtained from the plurality of external terminals 100, that display region 10*a* is allowed to be used; and permits external terminal 100 that has issued the use request for which display region 10*a* is determined to be allowed to be used, to use display region 10*a* selected by external terminal 100.

Accordingly, in response to the use request obtained from external terminal 100 having the highest priority degree among the use requests obtained from the plurality of external terminals 100, it is possible to permit external terminal 100 having the highest priority degree to use display region 10*a*. Therefore, even when a plurality of external terminals 100 issue use requests for permission to use the same display region 10*a*, display control device 30 can prevent display region manager 32 from permitting the plurality of external terminals 100 to use the same display region 10*a*.

Display control device 30 according to Embodiment further includes: display screen generator 34 that causes the plurality of displays 10 to display images, wherein when display region manager 32 permits the external device to use display region 10*a* selected by the external device, display screen generator 34: obtains, from external terminal 100, display information including information to be displayed on display region 10*a* selected by external terminal 100; renders an image of the display information obtained in a display mode associated with display region 10*a*, by executing the display mode; and causes display 10 corresponding to display region 10*a* which the external device is permitted to use among the plurality of displays 10, to display the image rendered.

Accordingly, an image suitable for display region 10*a* can be generated by executing the display mode. Therefore, display control device 30 can cause at least one display region 10*a* to display the display data suitable for the display region information.

Display control device 30 according to Embodiment further includes: control event generator 35 that issues an output request for outputting of the display information to external terminal 100, when a preset event occurs, wherein display screen generator 34: obtains, from external terminal 100, the display information based on the output request; renders an image of the display information obtained in a display mode associated with the preset event, by executing the display mode; and causes display 10 corresponding to display region 10*a* which the external device is permitted to use, to display the image rendered.

Accordingly, external terminal 100 is notified of the output request, and thus external terminal 100 can use display region 10*a*. Therefore, display control device 30 can improve convenience when external terminal 100 uses display region 10*a*.

OTHER EMBODIMENTS

Although the display control device, the display control system, the display control method, and the recording medium according to one or more aspects of the present disclosure has been described based on an embodiment, the present disclosure is not limited to this embodiment. Those skilled in the art will readily appreciate that embodiments arrived at by making various modifications to the above embodiment without materially departing from the scope of the present disclosure may be included within one or more aspects of the present disclosure.

For example, in the display control device, the display control system, the display control method, and the recording medium according to the embodiment described above, the display mode includes the exclusive display mode, the message display mode, the overlap display mode, and the event driven mode. However, it may suffice that these modes are selectively included. That is, the display mode need not necessarily include these four modes. In this case, when the display mode does not include the event driven mode, the display control device and the display control system need not include the control event generator. That is, the control event generator is not an essential constituent component of the display control device and the display control system.

Each of the elements in each of the display region manager, the display controller, control event generator, and display screen generator which are included in the display control device and the display control system according to Embodiment may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

Furthermore, all the numerical values indicated in the above are examples for explaining the present disclosure in detail, and do not limit the present disclosure.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

An order of performing the steps in each of the flowcharts is an example for explaining the present disclosure in detail. The steps may be performed in different orders. Different steps among the steps may be performed simultaneously, in other words, in parallel.

Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

While various embodiments have been described herein above, it is to be appreciated that various changes in form and detail may be made without departing from the spirit and scope of the present disclosure as presently or hereafter claimed.

INDUSTRIAL APPLICABILITY

The present disclosure is applicable to, for example, a vehicle, a device other than a vehicle, and a system that are provided with a plurality of display devices, and to a recording medium.

The invention claimed is:

1. A display control device for use in a vehicle provided with a plurality of displays each including one or more display regions, the display control device comprising:
a display region manager that manages a plurality of display regions that are the one or more display regions included in each of the plurality of displays, wherein
when the display region manager obtains, from an external terminal, a display request for displaying display data on a display region included in the plurality of display regions, the display region manager:
creates a display region table collectively indicating display region information on at least one display region among the plurality of display regions; and
outputs the display region table created to the external terminal.

2. The display control device according to claim 1, wherein
the display region manager:
extracts only a display region allowed to be used from the plurality of display regions; and
creates the display region table collectively indicating only the display region information on the display region extracted.

3. The display control device according to claim 1, wherein
the external terminal selects a display region to be used from among the plurality of display regions based on the display region table, and issues a use request for permission to use the display region selected, and
the display region manager:
obtains, from the external terminal, the use request for the display region selected by the external terminal;
determines whether or not the display region requested by the use request is allowed to be used;
when determining that the display region is allowed to be used, permits the external terminal for which the display region is determined to be allowed to be used, to use the display region selected by the external terminal; and
when determining that the display region is not allowed to be used, prohibits the external terminal for which the display region is not determined to be allowed to be used, from using the display region selected by the external terminal.

4. The display control device according to claim 1, wherein
the display region information includes, for each of the at least one display region, an identifier, a position, a size, a display mode, presence or absence of an input and an output for information, and a use condition.

5. The display control device according to claim 1, wherein
the display region manager:
creates the display region table collectively indicating the display region information on a display region selected to be used by the external terminal from among the plurality of display regions; and
outputs the display region table created to the external terminal.

6. The display control device according to claim 3, wherein
the display region manager:
determines that the display region is allowed to be used in response to the use request that is obtained first; and
permits the external terminal that has issued the use request for which the display region is determined to be allowed to be used, to use the display region selected by the external terminal.

7. The display control device according to claim 3, wherein
the display region manager:
determines, in response to the use request, that the display region is allowed to be used only by the external terminal to which a usage right has been granted beforehand; and
permits the external terminal that has issued the use request for which the display region is determined to be allowed to be used, to use the display region selected by the external terminal.

8. The display control device according to claim 3, wherein
the display region manager:
determines that the display region is allowed to be used in response to the use request obtained from a device to which a preferential usage right has been granted beforehand; and
preferentially permits the device that has issued the use request for which the display region is determined to be allowed to be used, to use the display region selected by the device.

9. The display control device according to claim 3, wherein
when the display region manager obtains a plurality of use requests each being the use request, the display region manager:
determines, in response to a use request for a display region associated with a use that is most similar to a use of a display mode associated with the display region among the plurality of use requests, that the display region is allowed to be used; and
permits the external terminal that has issued the use request for which the display region is determined to be allowed to be used, to use the display region selected by the external terminal.

10. The display control device according to claim 3, wherein
a plurality of external terminals each being the external terminal each have been preset with a priority degree based on which the display region is preferentially determined to be allowed to be used, and
the display region manager:
determines, in response to a use request obtained from an external terminal having a highest priority degree among a plurality of use requests obtained from the plurality of external terminals, that the display region is allowed to be used; and
permits the external terminal that has issued the use request for which the display region is determined to be allowed to be used, to use the display region selected by the external terminal.

11. The display control device according to claim 1, further comprising:
a display screen generator that causes the plurality of displays to display images, wherein
when the display region manager permits the external device to use the display region selected by the external device,
the display screen generator:
obtains, from the external terminal, display information including information to be displayed on the display region selected by the external terminal;
renders an image of the display information obtained in a display mode associated with the display region, by executing the display mode; and
causes a display corresponding to the display region which the external device is permitted to use among the plurality of displays, to display the image rendered.

12. The display control device according to claim 11, further comprising:
a control event generator that issues an output request for outputting of the display information to the external terminal, when a preset event occurs, wherein
the display screen generator:
obtains, from the external terminal, the display information based on the output request;
renders an image of the display information obtained in a display mode associated with the preset event, by executing the display mode; and
causes the display corresponding to the display region which the external device is permitted to use, to display the image rendered.

13. A display control system comprising:
the display control device according to claim 1; and
the plurality of displays.

14. A display control method for use in a vehicle provided with a plurality of displays each including one or more display regions, the display control method comprising:
managing a plurality of display regions that are the one or more display regions included in each of the plurality of displays;
when a display request for displaying of display data on a display region included in the plurality of display regions is obtained from an external terminal, creating a display region table collectively indicating display region information on at least one display region among the plurality of display regions; and
outputting the display region table created to the external terminal.

15. A non-transitory computer-readable recording medium for use in a computer, the recording medium having a computer program recorded thereon for causing the computer to execute the display control method according to claim 14.

* * * * *